(12) United States Patent
Lewis et al.

(10) Patent No.: US 10,737,978 B2
(45) Date of Patent: Aug. 11, 2020

(54) NON-AQUEOUS LIQUID ANTI-SHRINKAGE CEMENT ADDITIVES

(71) Applicant: Halliburton Energy Services, Inc., Houston, TX (US)

(72) Inventors: Samuel J Lewis, Spring, TX (US); Thomas Singh Sodhi, Humble, TX (US); Kyriacos Agapiou, Houston, TX (US); Aleksey Kolasnikov, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 86 days.

(21) Appl. No.: 16/080,884

(22) PCT Filed: May 19, 2016

(86) PCT No.: PCT/US2016/033251
§ 371 (c)(1),
(2) Date: Aug. 29, 2018

(87) PCT Pub. No.: WO2017/200543
PCT Pub. Date: Nov. 23, 2017

(65) Prior Publication Data
US 2019/0062213 A1 Feb. 28, 2019

(51) Int. Cl.
*E21B 33/13* (2006.01)
*C04B 22/06* (2006.01)
*C04B 40/00* (2006.01)
*C09K 8/467* (2006.01)
(Continued)

(52) U.S. Cl.
CPC .......... *C04B 22/066* (2013.01); *C04B 24/226* (2013.01); *C04B 24/36* (2013.01);
(Continued)

(58) Field of Classification Search
None
See application file for complete search history.

(56) References Cited

U.S. PATENT DOCUMENTS 4,293,429 A 10/1981 Cheng et al.
4,797,159 A * 1/1989 Spangle ................. C04B 2/102
106/694

(Continued)

FOREIGN PATENT DOCUMENTS

JP 20010021787 8/2002
WO 2016073000 5/2016

OTHER PUBLICATIONS

International Search Report and Written Opinion for PCT/US2016/033251 dated Jan. 17, 2017.

*Primary Examiner* — Andrew Sue-Ako
(74) *Attorney, Agent, or Firm* — Thomas Rooney; C.Tumey Law Group PLLC

(57) ABSTRACT

The present disclosure relates to a method of cementing comprising: providing a cement composition comprising: water, a cement, and a non-aqueous liquid anti-shrinkage cement additive comprising calcined magnesium oxide and a non-aqueous liquid; introducing the cement composition into a subterranean formation; and allowing the cement composition to set in the subterranean formation. Non-aqueous liquid anti-shrinkage cement additives, cement compositions, and systems are also provided.

8 Claims, 2 Drawing Sheets

(51) Int. Cl.
*C04B 28/02* (2006.01)
*C04B 24/22* (2006.01)
*C04B 24/36* (2006.01)
*C04B 111/34* (2006.01)
*C04B 103/40* (2006.01)
*C04B 103/44* (2006.01)
*C04B 103/56* (2006.01)
*C04B 111/00* (2006.01)

(52) U.S. Cl.
CPC .......... *C04B 28/02* (2013.01); *C04B 40/0039* (2013.01); *C09K 8/467* (2013.01); *E21B 33/13* (2013.01); *C04B 2103/408* (2013.01); *C04B 2103/44* (2013.01); *C04B 2103/58* (2013.01); *C04B 2111/00724* (2013.01); *C04B 2111/34* (2013.01); *C04B 2111/346* (2013.01)

(56) References Cited

U.S. PATENT DOCUMENTS

| | | | |
|---|---|---|---|
| 6,548,435 B1* | 4/2003 | Bugajski | C04B 35/043 501/109 |
| 8,580,716 B2 | 11/2013 | Ma et al. | |
| 9,212,095 B2 | 12/2015 | Bury et al. | |
| 2002/0193256 A1* | 12/2002 | Harris, Jr. | A01N 25/04 507/200 |
| 2009/0305019 A1 | 12/2009 | Chanvillard et al. | |
| 2012/0298012 A1 | 11/2012 | Berke et al. | |
| 2014/0076561 A1* | 3/2014 | Reddy | C04B 28/32 166/293 |
| 2015/0107494 A1* | 4/2015 | Al-Yami | C04B 28/02 106/801 |

* cited by examiner

NON-AQUEOUS LIQUID ANTI-SHRINKAGE CEMENT ADDITIVES

BACKGROUND

In well cementing, such as well construction and remedial cementing, cement compositions are commonly utilized. Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A particular challenge in well cementing is the development of satisfactory mechanical properties in a cement composition within a reasonable time period after placement in the subterranean formation. During the life of a well, the cement sheath undergoes numerous strains and stresses as a result of temperature effects, pressure effects, and impact effects. The ability to withstand these strains and stresses is directly related to the mechanical properties of the settable composition after setting. The mechanical properties are often characterized using parameters such as compressive strength, tensile strength, Young's Modulus, Poisson's Ratio, elasticity, and the like. These properties may be modified by the inclusion of additives.

Conventional cement compositions have the limitation of shrinking during cement hydration. The shrinkage of the cement composition may result in the stresses that lead to damage of the cement sheath. The cement sheath may de-bond from the casing or formation resulting in micro-annuli and compromised zonal isolation. In some instances, such as certain combinations of depth and formation properties, even when external fluid is available to fully hydrate the cement composition, the cement sheath may become stressed during hydration and may not be able to withstand subsequent well operations.

One additive used to enhance mechanical properties is an anti-shrink additive. The anti-shrink additive helps prevent premature failure of the cement sheath by inhibiting or preventing cracks from forming. In some instances, cracks and gaps formed may lead to the migration of gas and fluid within the well and loss of zonal isolation. There may be considerable expense involved to repair a well with a failed cement sheath. In some instances the damage may be extensive enough to where the well needs to be abandoned.

BRIEF DESCRIPTION OF THE DRAWINGS

These drawings illustrate certain aspects of some of the embodiments of the present disclosure, and should not be used to limit or define the method.

DETAILED DESCRIPTION

Figure 1:
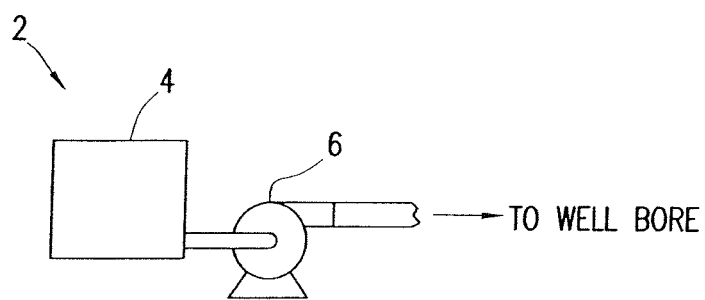
FIG. 1 is a schematic illustration of a system for preparation and delivery of a cement composition to a wellbore in accordance with certain examples.

The present disclosure relates to a non-aqueous liquid anti-shrinkage cement additive and, in specific examples, to methods, compositions, and systems that use a non-aqueous liquid anti-shrinkage cement additive in well cementing. By way of example the non-aqueous liquid anti-shrinkage cement additive may, without limitation, be used in Portland cement, pozzolan-lime cement, slag-lime cement, super sulfated cements, calcium sulfoaluminate cement, or geopolymer cements to reduce or eliminate the shrinkage associated with curing of the cement. As disclosed herein, an "anti-shrinkage cement additive" is defined to mean an additive that will cause a non-negative volumetric change in a cement composition as measured based on the tests and calculations in API RP 10B-5 at 190° F. and ambient pressure. Those of ordinary skill in the art will recognize that the minimum concentration of a particular additive to cause a positive volumetric expansion will vary based on a number of factors, which may include the type of additive, the type of cement, and additional additives present, among others.

There may be many factors that may lead to shrinking and cracking of cement compositions. One of the most important factors may be total water content of the cement composition. When excess water separates from a curing cement compound, a meniscus may set up within the capillaries or pores of the cement. The high surface tension of the water may cause a stress to be exerted on the internal walls of the capillaries or pores wherein the meniscus may have formed. This stress may be in the form of an inward pulling force that tends to close up the capillary or pore. The volume of the capillary may thusly be reduced, leading to shrinkage of the cement composition, and resulting in an overall reduction of volume. The addition of an anti-shrinkage additive may eliminate the reduction in volume by exerting a swelling force or outward pushing force on the cement composition.

Calcined magnesium oxide may be included in cement compositions as an anti-shrinkage additive. Calcined magnesium oxide may set to form a hardened mass upon reacting with water and may further react with other components in the cement composition such as for example, a Portland cement, to contribute to the final compressive strength of the cement composition. Calcined magnesium oxide may swell upon setting and exert an outward force on the cement composition. The swelling force may contribute to a reduction in total shrinkage and in some instances, may cause an increase in total cement volume. Calcined magnesium oxide may further scavenge free water within the cement composition, thereby reducing the amount of water available to exert an inward force.

There may be many advantages to using liquid additives in cementing. Liquid additives generally do not need to be mixed before use and may be easier to store and transport than solid additives. Liquids may readily be transported via tubulars and pumps which is particularly useful to offshore applications where space may be limited. Liquid materials may also be required for regulatory purposes. For many operations, liquid additives may reduce complexity of equipment needed as the additive can generally be pumped directly into mixing tubs or storage containers. Liquid additives may also eliminate dusting and complexities of transporting and delivering dry additives in sacks or containers. As liquids generally do not need to be mixed prior to combination with other cement components, equipment that would be used to mix solid additives may be eliminated. Liquid additives volumes may generally be easier to measure than dry additives and pre-mixed liquid additives delivered to a site may generally be more uniform in concentration that what could be prepared on the fly at a location. The limited variability of liquid additives may make the cement compositions more uniform in quality and mechanical properties.

Calcined magnesium oxide may set to form a hardened mass in the presence of water. Once the water and calcined magnesium oxide are mixed, there may be a limited time window before the suspension becomes thick and un-pumpable. The limited pump time of the suspension makes it non-ideal to store for extended periods of time. An aqueous suspension of calcined magnesium oxide would therefore not be ideal as a liquid additive since the suspension may set before it can be added to a cement slurry. The use of non-aqueous solvents as the suspending medium precludes the calcined magnesium oxide from hydrating while in suspension. However, it has been found that conventional oil suspensions do not provide adequate rheological stability either in the additive suspension or upon mixing the additive suspension with cement. Conventional oil suspensions comprising calcined magnesium oxide may result in a gelled additive and/or gelation in a cement slurry upon introducing the additive to the cement slurry. The gelation can cause many undesirable effects including but not limited to poor mixing, reduced compressive strength, poor zonal isolation, and increased load and wear on equipment. For at least these reasons, a non-aqueous liquid anti-shrinkage cement additive that does not exhibit gelling would be useful in well cementing.

Without limitation, the non-aqueous liquid anti-shrinkage cement additive may comprise a non-aqueous fluid, a dispersant, a viscosifying additive, an emulsifying agent, and calcined magnesium oxide.

The non-aqueous fluid may comprise a hydrocarbon liquid. The hydrocarbon liquid may, without limitation, comprise alkanes, unsaturated hydrocarbons such as alkenes and alkynes, cycloalkanes, aromatic hydrocarbons, and any mixtures thereof. Hydrocarbon liquids may further comprise, without limitation, mixtures of hydrocarbons such as natural gas liquids, liquid parrafins, naphthas, mineral oils, crude oils, synthesized hydrocarbon liquids, fuel oils, diesels, gasolines, biomass derived hydrocarbon liquids, coal derived hydrocarbon liquids, kerosene, and any mixtures thereof. Without limitation, the hydrocarbon liquid may be present in an amount of about 1% to about 99% by weight in the non-aqueous liquid anti-shrinkage cement additive. The hydrocarbon liquid may be present in an amount, for example, ranging between any of and/or including any of about 5%, about 10%, about 15%, about 20%, about 25%, about 30%, about 35%, about 40%, about 45%, about 50%, about 55%, about 60%, about 65%, about 70%, about 75%, about 80%, about 90%, about 95%, or about 99% by weight in the non-aqueous liquid anti-shrinkage cement additive.

The dispersant may comprise any of a variety of suitable compounds. In general, a dispersant should remain stable while suspended in the non-aqueous solvent, enable the components of the non-aqueous liquid anti-shrinkage additive to be easily mixed and enable easy pumping, and/or reduce viscosity of a cement composition when the non-aqueous liquid anti-shrinkage additive is added. The dispersant, without limitation, may comprise sulfonated naphthalene condensate, sulfonated acetone formaldehyde condensate, polycarboxylate ethers, micro particles, or any combination thereof. An example of a dispersant additive is available from Halliburton Energy Services Inc. under the trade name CFR™-3 cement friction reducer. Without limitation, the dispersant may be present in an amount of about 0.01% to about 5% by weight in the non-aqueous liquid anti-shrinkage cement additive. The dispersant may be present in an amount, for example, ranging between any of and/or including any of about 0.01%, about 1%, about 2%, about 3%, about 4%, or about 5% by weight in the non-aqueous liquid anti-shrinkage cement additive.

The viscosifying additive may comprise any of a variety of suitable compounds. In general, a viscosifying additive should be able to increase and maintain the viscosity of oleaginous liquids, and maintain a stable suspension with solids. The viscosifying additive, without limitation, may comprise organophilic clay or other suitable hydrocarbon thickeners, such as hydrophobically modified silica, hydrophobically modified bio-polymers, and hydrophobically modified synthetic polymers. An example of an organophilic clay is available from Halliburton Energy Services, Inc. under the trade name Claytone® II rheological additive. Without limitation, the viscosifying additive may be present in an amount of about 0.01% to about 10% by weight in the non-aqueous liquid anti-shrinkage cement additive. The viscosifying additive may be present in an amount, for example, ranging between any of and/or including any of about 0.01%, about 1%, about 2%, about 3%, about 4%, about 5%, about 6%, about 7%, about 8%, about 9%, or about 10% by weight in the non-aqueous liquid anti-shrinkage cement additive.

The emulsifying agent may comprise any of a variety of suitable compounds. The emulsifying agent may be hydrophilic or hydrophobic in nature. In some examples, the emulsifying agent may comprise both hydrophilic and hydrophobic compounds. Hydrophilic emulsifiers may comprise, without limitation, polysorbates. Hydrophobic emulsifiers may comprise, without limitation, sorbitan esters. Without limitation, the emulsifying agent may be present in an amount of about 0.01% to about 10% by weight in the non-aqueous liquid anti-shrinkage cement additive. The emulsifying agent may be present in an amount, for example, ranging between any of and/or including any of about 0.01%, about 1%, about 2%, about 3%, about 4%, about 5%, about 6%, about 7%, about 8%, about 9%, or about 10% by weight in the non-aqueous liquid anti-shrinkage cement additive.

The non-aqueous liquid anti-shrinkage cement additive may comprise calcined magnesium oxide (MgO). Calcined magnesium oxide may be produced, for example, by the calcination of naturally occurring minerals such as magnesite which has the chemical formula $MgCO_3$ and magnesium hydroxide $Mg(OH)_2$. Calcination is the process of heating a compound at elevated temperature to affect desirable properties. The thermal treatment of calcination affects the surface area and pore size and hence the reactivity of magnesium oxide formed. Caustic calcined magnesia (light burned magnesium oxide) may be produced by calcining in the range of 700° C. to 1000° C. Calcining in the range of 1500° C. to 2000° C. produces dead-burned magnesium oxide. The degree of calcination may impact the operating temperature window of the additive. For example, dead-burned magnesium oxide may be used at higher operating temperatures than light-burned magnesium oxide owing to a greater amount of thermal energy needed to induce reactivity. An example of magnesium oxide additive is available from Halliburton Energy Services Inc. under the trade name Microbond HT™ expanding additive. The calcined magnesium oxide may be present in any amount from about 1% to about 99% by weight of the non-aqueous liquid anti-shrinkage cement additive. The calcined magnesium oxide may be present in an amount, for example, ranging between any of and/or including any of about 5%, about 10%, about 15%, about 20%, about 25%, about 30%, about 35%, about 40%, about 45%, about 50%, about 55%, about 60%, about 65%, about 70%, about 75%, about 80%, about 90%, about 95%, or about 99% by weight in the non-aqueous liquid anti-shrinkage cement additive.

The non-aqueous liquid anti-shrinkage cement additive may be prepared by any suitable means. In some examples, the cement additive may be prepared by measuring a predetermined amount of each of the liquid components into a container. The liquid components may comprise the non-aqueous liquid, dispersant, and/or emulsifying agents. The non-aqueous liquid and other liquid components may be sheared until a homogenous solution is obtained. A predetermined amount of solid additives may be added to the container. The solid additives may comprise the viscosifying additive and/or calcined magnesium oxide. The solution may be further sheared until the solid particles are uniformly dispersed. The resulting solid-in-oil suspension may be stored for an extended period of time such as about 1 day to about 1 year.

A cement composition suitable for well cementing may comprise the non-aqueous liquid anti-shrinkage additive. Without limitation, the cement composition may comprise cement, non-aqueous liquid anti-shrinkage cement additive, and water. Those of ordinary skill in the art will appreciate that the cement compositions generally should have a density suitable for a particular application. By way of example, the cement composition may have a density in the range of from about 4 pounds per gallon ("lb/gal") to about 20 lb/gal and, in some compositions, a density in the range of from about 8 lb/gal to about 17 lb/gal. The cement compositions may be foamed or unfoamed or may comprise other means to reduce their densities, such as hollow microspheres, low-density elastic beads, or other density-reducing additives known in the art. Those of ordinary skill in the art, with the benefit of this disclosure, should recognize the appropriate density for a particular application.

Any of a variety of cements suitable for use in subterranean cementing operations may be used in the disclosed cement compositions. Suitable examples may include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica cements, geopolymer cements and combinations thereof. Without limitation, the hydraulic cement may comprise a Portland cement. Without limitation, Portland cements that may be suited for use may be classified as Class A, C, H and G cements according to American Petroleum Institute, API Specification for Materials and Testing for Well Cements, API Specification 10, Fifth Ed., Jul. 1, 1990. In addition, in some embodiments, hydraulic cements suitable for use may be classified as ASTM Type I, II, or III. Without limitation, the cement may be present in the cement compositions in an amount in the range of from about 10% to about 80% by weight of the cement composition. The cement may be present in an amount, for example, ranging between any of and/or including any of about 10%, about 20%, about 30%, about 40%, about 50%, about 60%, about 70%, or about 80% by weight of the cement composition. One of ordinary skill in the art, with the benefit of this disclosure, should be able to select an appropriate amount of cement for a particular application.

Without limitation, the water used in the cement compositions may be fresh water or salt water. As used herein, the term "salt water" refers to unsaturated salt water and saturated salt water, including brines and seawater. Generally, the water may be from any source, provided that it should not contain an excess of compounds that may undesirably affect other components in the foamed cement composition. Further, the water may be present in an amount sufficient to form a pumpable slurry. Without limitation, the water may be present in the cement composition in an amount in the range of about 33% to about 200% by weight of the cement ("bwoc"). For example, the water may be present in the cement composition in the range of about 35% to about 70% bwoc. Alternatively, the concentration of the water may be expressed by weight over the overall cement composition, such from about 20% to about 80% by weight of the cement composition, including about 20%, about 30%, about 40%, about 50%, about 60%, about 70%, or about 80% by weight of the cement composition. One of ordinary skill in the art with the benefit of this disclosure should recognize the appropriate amount of water for a chosen application.

Without limitation, the non-aqueous liquid anti-shrinkage cement additive may be included in the cement composition in an amount in the range of about 0.01% to about 10% bwoc. For example, the non-aqueous liquid anti-shrinkage cement additive may be present in the cement composition in the range of about 1% to about 5% bwoc. Alternatively, the concentration of the non-aqueous liquid anti-shrinkage cement additive may be expressed by weight over the overall cement composition, such from about 0.01% to about 5% by weight of the cement composition, including about 1%, about 2%, about 3%, about 4%, or about 5% by weight of the cement composition. One of ordinary skill in the art with the benefit of this disclosure should recognize the appropriate amount of non-aqueous liquid anti-shrinkage cement additive for a chosen application.

Other additives suitable for use in subterranean cementing operations also may be added to the cement compositions as desired for a particular application. Examples of such additives include, but are not limited to, strength-retrogression additives, set accelerators, set retarders, weighting agents, lightweight additives, gas-generating additives, mechanical property enhancing additives, lost-circulation materials, filtration-control additives, dispersants, a fluid loss control additive, defoaming agents, foaming agents, thixotropic additives, and combinations thereof. By way of example, the cement composition may be a foamed cement composition further comprising a foaming agent and a gas. Specific examples of these, and other, additives include crystalline silica, amorphous silica, fumed silica, salts, fibers, hydratable clays, calcined shale, vitrified shale, microspheres, fly ash, slag, diatomaceous earth, metakaolin, rice husk ash, natural pozzolan, zeolite, lime, elastomers, resins, latex, combinations thereof, and the like. A person having ordinary skill in the art, with the benefit of this disclosure, will readily be able to determine the type and amount of additive useful for a particular application and desired result.

As will be appreciated by those of ordinary skill in the art, the non-aqueous liquid anti-shrinkage cement additive may be used in a variety of subterranean applications, including primary and remedial cementing. Without limitation, the cement compositions comprising the non-aqueous liquid anti-shrinkage cement additive may be introduced into a subterranean formation and allowed to set. As used herein, introducing the cement composition into a subterranean formation includes introduction into any portion of the subterranean formation, into near wellbore region surrounding the wellbore, or into both. In primary cementing applications, for example, the cement compositions may be introduced into the annular space between a conduit located in a wellbore and the walls of the wellbore (and/or a larger conduit in the wellbore), wherein the wellbore penetrates the subterranean formation. The cement composition may be allowed to set in the annular space to form an annular sheath of hardened cement. The cement composition may form a barrier that prevents the migration of fluids in the wellbore. The cement composition may also, for example, support the conduit in the wellbore. In remedial cementing applications, the cement compositions may be used, for example, in squeeze cementing operations or in the placement of cement plugs. By way of example, the cement compositions may be placed in a wellbore to plug an opening (e.g., a void or crack) in the formation, in a gravel pack, in the conduit, in the cement sheath, and/or between the cement sheath and the conduit (e.g., a microannulus).

Without limitation, an example method of cementing may comprise providing a cement composition comprising: water, a cement, and a non-aqueous liquid anti-shrinkage cement additive comprising calcined magnesium oxide and a non-aqueous liquid; introducing the cement composition into a subterranean formation; and allowing the cement composition to set in the subterranean formation. This method of cementing may include any of the various features of the additives, compositions, methods, and systems disclosed herein. The non-aqueous liquid may comprise a hydrocarbon liquid. Without limitation, the non-aqueous liquid anti-shrinkage cement additive may further comprise a dispersant selected from the group consisting of sulfonated naphthalene condensate, sulfonated acetone formaldehyde condensate, polycarboxylate ethers, micro particles, and any combination thereof. The non-aqueous liquid anti-shrinkage cement additive may further comprise a viscosifying additive. The non-aqueous liquid anti-shrinkage cement additive may further comprise an emulsifying additive. The non-aqueous liquid anti-shrinkage cement additive may further comprise a dispersant and an emulsifying additive, wherein the method further comprises providing the non-aqueous liquid anti-shrinkage cement additive and combining the non-aqueous liquid anti-shrinkage cement additive with the water and the cement.

Without limitation, an example of a non-aqueous liquid anti-shrinkage cement additive may comprise: a non-aqueous liquid; and calcined magnesium oxide. This non-aqueous liquid anti-shrinkage cement additive may include any of the various features of the additives, compositions, methods, and systems disclosed herein. The non-aqueous liquid may comprise a hydrocarbon liquid. The non-aqueous liquid anti-shrinkage cement additive may further comprise a dispersant selected from the group consisting of sulfonated naphthalene condensate, sulfonated acetone formaldehyde condensate, polycarboxylate ethers, micro particles, and any combination thereof. The non-aqueous liquid anti-shrinkage cement additive may further comprise a viscosifying additive. The non-aqueous liquid anti-shrinkage cement additive may further comprise an emulsifying additive.

Without limitation, an example of a cement composition may comprise a cement composition comprising water; a cement; and a non-aqueous liquid anti-shrinkage cement additive comprising calcined magnesium oxide and a non-aqueous liquid. This cement composition may include any of the various features of the additives, compositions, methods, and systems disclosed herein. The non-aqueous liquid may comprise a hydrocarbon liquid. The non-aqueous liquid anti-shrinkage cement additive may further comprise a dispersant selected from the group consisting of sulfonated naphthalene condensate, sulfonated acetone formaldehyde condensate, polycarboxylate ethers, micro particles, and any combination thereof. The non-aqueous liquid anti-shrinkage cement additive may further comprise a viscosifying additive. The non-aqueous liquid anti-shrinkage cement additive may further comprise an emulsifying additive.

Without limitation, an example of a system for cementing in a subterranean formation comprising: a cement composition comprising a cement, water, a non-aqueous liquid anti-shrinkage cement additive, wherein the non-aqueous liquid anti-shrinkage cement additive comprises calcined magnesium oxide and a non-aqueous liquid; mixing equipment capable of mixing the cement composition; and pumping equipment capable of delivering the cement composition into a wellbore. This system may include any of the various features of the additives, compositions, methods, and systems disclosed herein. The non-aqueous liquid may comprise a hydrocarbon liquid. The non-aqueous liquid anti-shrinkage cement additive may further comprise a dispersant selected from the group consisting of sulfonated naphthalene condensate, sulfonated acetone formaldehyde condensate, polycarboxylate ethers, micro particles, and any combination thereof. The non-aqueous liquid anti-shrinkage cement additive may further comprise a viscosifying additive. The non-aqueous liquid anti-shrinkage cement additive may further comprise an emulsifying additive.

Referring now to FIG. 1, preparation of a cement composition comprising a non-aqueous liquid anti-shrinkage cement additive in accordance with example systems, methods and cement compositions will now be described. FIG. 1 illustrates a system 2 for preparation of a cement composition and delivery to a wellbore in accordance with certain systems, methods and cement compositions. As shown, the cement composition may be mixed in mixing equipment 4, such as a jet mixer, re-circulating mixer, or a batch mixer, for example, and then pumped via pumping equipment 6 to the wellbore. In some systems, methods and compositions, the mixing equipment 4 and the pumping equipment 6 may be disposed on one or more cement trucks as will be apparent to those of ordinary skill in the art.

Figure 2A:
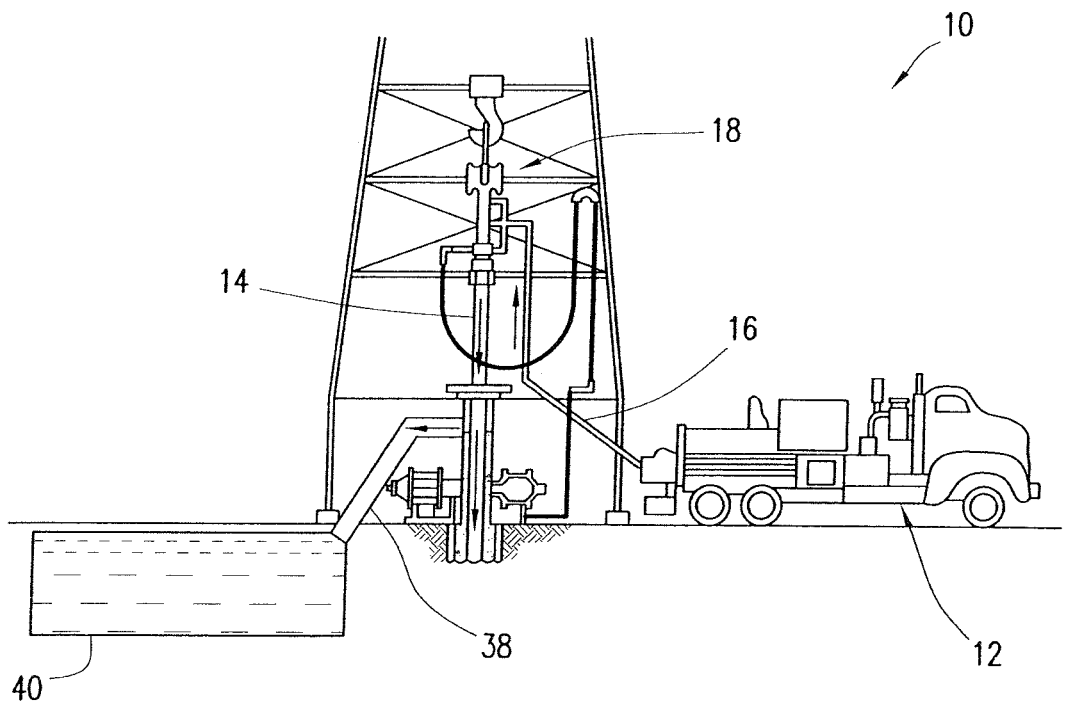
FIG. 2A is a schematic illustration of surface equipment that may be used in placement of a cement composition in a wellbore in accordance with certain examples.

An example technique for placing a cement composition comprising a non-aqueous liquid anti-shrinkage additive, as described herein, into a subterranean formation will now be described with reference to FIGS. 2A and 2B. FIG. 2A illustrates surface equipment 10 that may be used in placement of a cement composition. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole Turning now to FIG. 2B, the cement composition 14 may be placed into a subterranean formation 20 in accordance with example systems, methods and cement compositions. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustration, a surface casing 26 has been inserted into the wellbore 22. The surface casing 26 may be cemented to the walls 24 of the wellbore 22 by cement sheath 28. In the illustration, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

Figure 2B:
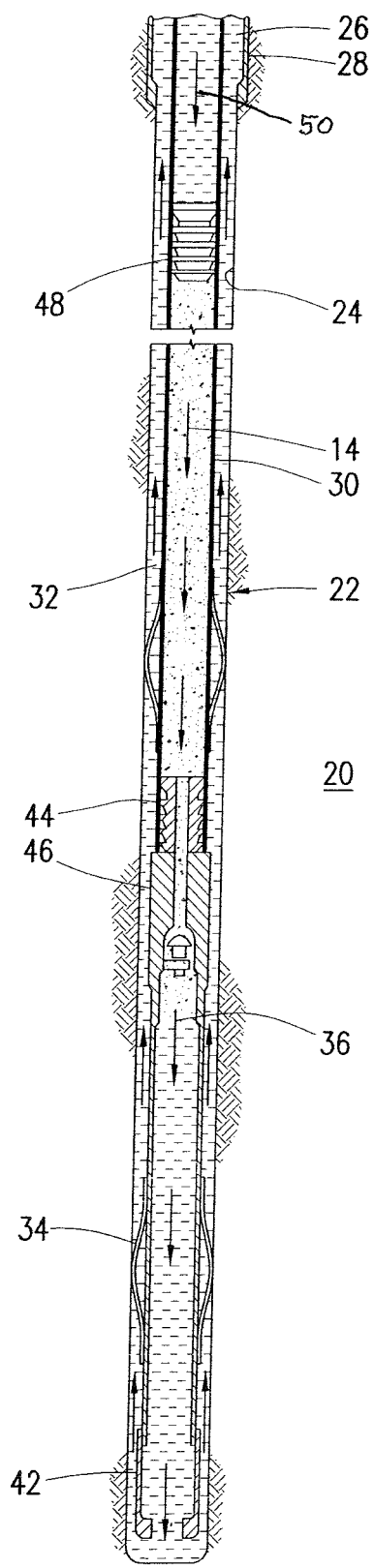
FIG. 2B is a schematic illustration of placement of a cement composition into a wellbore annulus in accordance with certain examples.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath that supports and positions the casing 30 in the wellbore 22. While not illustrated, other techniques may also be utilized for introduction of the cement composition 14. By way of example, reverse circulation techniques may be used that include introducing the cement composition 14 into the subterranean formation 20 by way of the wellbore annulus 32 instead of through the casing 30.

As it is introduced, the cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device should rupture to allow the cement composition 14 through the bottom plug 44. In FIG. 2B, the bottom plug 44 is shown on the landing collar 46. In the illustration, a top plug 48 may be introduced into the wellbore 22 behind the cement composition 14. The top plug 48 may separate the cement composition 14 from a displacement fluid 50 and also push the cement composition 14 through the bottom plug 44.

The exemplary cement compositions disclosed herein may directly or indirectly affect one or more components or pieces of equipment associated with the preparation, delivery, recapture, recycling, reuse, and/or disposal of the disclosed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like. The disclosed cement compositions may also directly or indirectly affect the various downhole equipment and tools that may come into contact with the cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present disclosure, the following examples of certain aspects of some of the systems, methods and cement compositions are given. In no way should the following examples be read to limit, or define, the entire scope of the disclosure.

Example 1

This example provides a formative comparison of non-aqueous liquid anti-shrinkage additives with (I) and without (II) dispersant, and rheology measurements for the two. The rheology measurements were taken with a FANN® 35 viscometer and are reported in centipoise. Claytone® II rheological additive is an organophilic clay available from Halliburton Energy Services, Inc. which acts as a viscosifying additive. Polysorbate is a hydrophilic emulsifier and sorbitan ester is a hydrophobic emulsifier. CFR-3™ cement friction reducer is a dual purpose cement friction reducer and dispersant available from Halliburton Energy Services, Inc. In the following table, "% bw" refers to percent of the component by weight of the overall non-aqueous liquid anti-shrinkage additive.

TABLE 1

| Material | I (% bw) | II (% bw) |
|---|---|---|
| Mineral Oil | 53.85 | 53.68 |
| Claytone ® II Rheological Additive | 3.75 | 3.98 |
| Polysorbate | 2.4 | — |

TABLE 1-continued

| Material | I (% bw) | II (% bw) |
|---|---|---|
| Sorbitan Ester | — | 1.59 |
| Calcined MgO | 40 | 39.76 |
| CFR-3 ™ Cement Friction Reducer | — | 0.99 |
| Total | 100 | 100 |
| Ave Rheology of Additive | | |
| 300 rpm | 300 | 242 |
| 200 rpm | 290 | 187 |
| 100 rpm | 186 | 118 |
| 60 rpm | 137 | 76 |
| 30 rpm | 92 | 46 |
| 6 rpm | 46 | 30 |
| 3 rpm | 36 | 24 |

Example 2

This example provides a comparison between cement compositions mixed with non-aqueous liquid anti-shrinkage additives from Example 1 that did not contain (III) and did contain (IV) dispersant. D-Air 3000L™ defoamer available from Halliburton Energy Services, Inc. was included in each cement composition. The viscosity measurements were taken on a FANN® 35 viscometer with the viscosities reported in centipoise. Slurry III was prepared without dispersant was unmixable. The slurry increased in viscosity to form a gel and was unable to be tested further. In the table below, "gal/sk" refers to gallons of the additive per 94 pound sack of the cement.

TABLE 2

| Material | III | IV |
|---|---|---|
| Class H Premium Cement | 100 % bwoc | 100 % bwoc |
| I | 1.12 gal/sk | — |
| II | — | 1.12 gal/sk |
| Defoamer | 0.02 gal/sk | 0.02 gal/sk |
| Water | 3.7 gal/sk | 3.7 gal/sk |
| Total | 100 | 100 |
| Ave Rheology of Cement + Additive | | |
| 300 rpm | Unmixable without the | 242 |
| 200 rpm | assistance of a spatula, | 201 |
| 100 rpm | and was paste after | 153 |
| 60 rpm | mixing. No rheology | 110 |
| 30 rpm | measurements could be | 82 |
| 6 rpm | collected. | 34 |
| 3 rpm | | 24 |

Example 3

This example provides a comparison between different cement compositions and the expansion performance over time. Table 3 shows the three cement compositions that were prepared. Slurry V contains a conventional dry expansion additive calcined magnesium oxide. Slurry VI contains a representative non-aqueous calcined magnesium oxide provided in a non-aqueous liquid anti-shrinkage additive. Slurry VII contains no expansion additive. D-Air 3000L™ defoamer available from Halliburton Energy Services, Inc. was included in each cement composition. Cement compositions V-VII were subjected to ring mold expansion tests according to API RP 10B-5, cured at 190° F. at ambient pressure in a recirculating water bath. Table 4 shows the results of the test. In the table below, "gal/sk" refers to gallons of the additive per 94 pound sack of the cement.

TABLE 3

| | V | | VI | | VII | |
|---|---|---|---|---|---|---|
| Class H Cement | 100 | % bwoc | 100 | % bwoc | 100 | % bwoc |
| Dry Calcined MgO | 5 | % bwoc | — | — | — | — |
| Non-Aqueous Calcined MgO | — | — | 1.15 | gal/sk | — | — |
| Defoamer | 0.02 | gal/sk | 0.02 | gal/sk | 0.02 | gal/sk |
| Tap Water | 4.81 | gal/sk | 4.81 | gal/sk | 4.81 | gal/sk |

TABLE 4

| | % Expansion Curing Time (days) | | | | |
|---|---|---|---|---|---|
| | 1 | 3 | 6 | 9 | 12 |
| V | 0 | 0.06 | 0.589 | 2.046 | 3.357 |
| VI | 0 | 0.211 | 1.665 | 2.966 | 3.765 |
| VII | 0 | −0.01 | −0.013 | −0.021 | −0.017 |

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A method of cementing comprising:
providing a non-aqueous liquid anti-shrinkage cement additive comprising:
calcined magnesium oxide; and
a non-aqueous liquid comprising a hydrocarbon liquid; and
combining water, a cement, and the non-aqueous liquid anti-shrinkage cement additive to form a cement composition;
introducing the cement composition into a subterranean formation; and
allowing the cement composition to set in the subterranean formation.

2. The method of claim 1 wherein the non-aqueous liquid anti-shrinkage cement additive further comprises a dispersant selected from the group consisting of sulfonated naphthalene condensate, sulfonated acetone formaldehyde condensate, polycarboxylate ethers, micro particles, and any combination thereof.

3. The method of claim 1 wherein the non-aqueous liquid anti-shrinkage cement additive further comprises a viscosifying additive.

4. The method of claim 1 wherein the non-aqueous liquid anti-shrinkage cement additive further comprises an emulsifying additive.

5. The method of claim 1 wherein the non-aqueous liquid anti-shrinkage cement additive further comprises a dispersant and an emulsifying additive.

6. A system for cementing in a subterranean formation comprising:
a non-aqueous liquid anti-shrinkage cement additive comprising:
calcined magnesium oxide;
a non-aqueous liquid comprising a hydrocarbon liquid; and
mixing equipment capable of mixing the non-aqueous anti-shrinkage cement additive with a cement and water to form a cement composition; and
pumping equipment capable of delivering the cement composition into a wellbore.

7. The system of claim 6 wherein the non-aqueous liquid anti-shrinkage cement additive further comprises a dispersant selected from the group consisting of sulfonated naphthalene condensate, sulfonated acetone formaldehyde condensate, polycarboxylate ethers, micro particles and any combination thereof.

8. The system of claim 6 wherein the non-aqueous liquid anti-shrinkage cement additive further comprises an emulsifying additive and a viscosifying additive.

* * * * *